Figure 1:
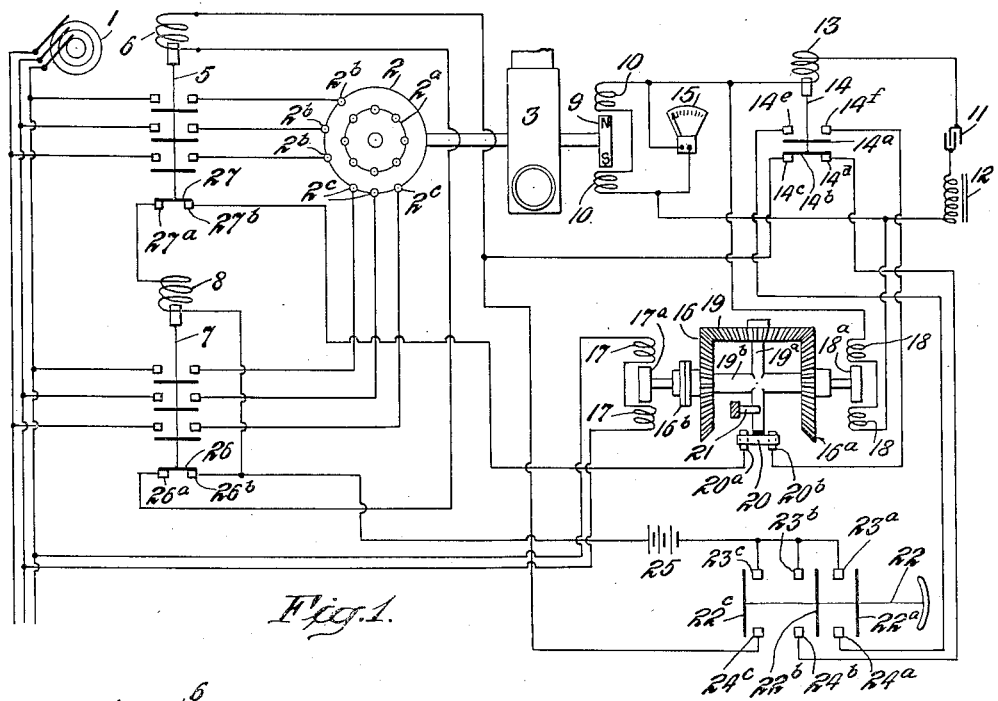

Sept. 5, 1939.  S. E. SCHULTZ  2,171,996

ELECTRIC CONTROLLING APPARATUS

Filed May 7, 1936

INVENTOR
SOLOMON E. SCHULTZ
BY
Lawrence K. Sager
his ATTORNEY

Patented Sept. 5, 1939

2,171,996

UNITED STATES PATENT OFFICE 2,171,996

ELECTRIC CONTROLLING APPARATUS

Solomon E. Schultz, Bogota, N. J., assignor to Ward Leonard Electric Company, a corporation of New York Application May 7, 1936, Serial No. 78,450

19 Claims. (Cl. 172—239)

This invention relates to controlling apparatus wherein it is desired to cause certain parts to function at a selected critical speed or speeds. This response may be made effective at a certain speed during acceleration of the device to be controlled and the response may be made effective at the same speed during deceleration or at a different speed during deceleration. The invention is adapted to the control of apparatus for various purposes and to the control of various types of apparatus. A particular embodiment of the invention is disclosed herein for controlling a motor having different windings for operation of the motor at different speeds. One use of such a motor is for the purpose of driving a fan at different speeds for ventilation of buildings and other structures according to the requirements.

In the operation of variable speed fans it has been the practice to use squirrel cage induction motors for driving the fans, the motors being provided with different stator windings for driving the motors at different speeds corresponding to the respective winding connected in circuit. In passing from a high speed to a lower speed winding, the change in circuit connections cannot be immediately made because considerable time is required for the motor and fan to fall to the lower speed. From an ideal standpoint the lower speed winding should be connected to the line at the instant the motor or fan decelerates to the speed corresponding to the synchronous field speed of that winding. The stresses imposed upon the motor and fan are zero and the inrush current to the motor is at a minimum if connections are made at this instant; but these stresses and current increase abruptly to high values when connections are made at points above or below synchronous speed within a comparatively small range. Hence it is desirable to connect the winding at the instant when the motor is rotating at synchronous speed. If the winding corresponding to the lower speed be connected before the motor and fan has dropped to that speed, a generating action occurs which may reach dangerous proportions and damage the apparatus. If connections are made at a speed below the synchronous field speed of that winding, a motor action occurs which, from a design standpoint, is usually not considered so dangerous as the corresponding generator action. For this reason when shifting from a given speed to a lower one, a time-delay relay has been used in the control circuit which prevents the connecting of the low speed winding to the line until a certain predetermined time has elapsed after disconnection of the high speed winding to insure the motor acting as a motor as distinguished from acting as a generator. Owing to the fact that the operation of the time-delay control has no direct relation to the actual speed of the fan motor, the results are unsatisfactory and undependable. The disadvantage of such a control has been attempted to be overcome by providing an ample time delay interval to insure that the fan motor speed will be below the speed corresponding to the lower speed winding. This is undesirable because the time interval is necessarily prolonged to such an extent that the speed of the fan drops so far below the normal lower speed that when the lower speed winding is connected, the motor must be accelerated to the normal speed which causes undue fan and motor stresses and a large inrush of current and disturbance of the supply line voltage. Moreover if more than two speeds are used for the fan drive, the number of time-delay relays and their connections become complicated.

By the present invention the control of the motor and fan can be made critically responsive to speed so that it is possible to connect a motor winding to the line at virtually its synchronous field speed, or any other speed desired, no matter what the initial point of fan deceleration or acceleration happens to be. One object of the present invention is to provide a dependable control apparatus which will be directly responsive to the speed of the device to be controlled and which will be reliable in its accuracy of response. Another object is to provide equipment which will be durable over long periods of use and wherein delicate precision type of instruments are avoided. Another object is to provide control apparatus which will be comparatively inexpensive in initial cost and in cost of maintenance and in which the requirements of inspection and repairs are reduced to a minimum. Another object is to accomplish the desired result with comparatively few parts of simple construction and wherein the inter-connected circuits are free from complication. Other objects and advantages will be understood from the following description and accompanying drawing which illustrate preferred embodiments of the invention.

Figure 2:
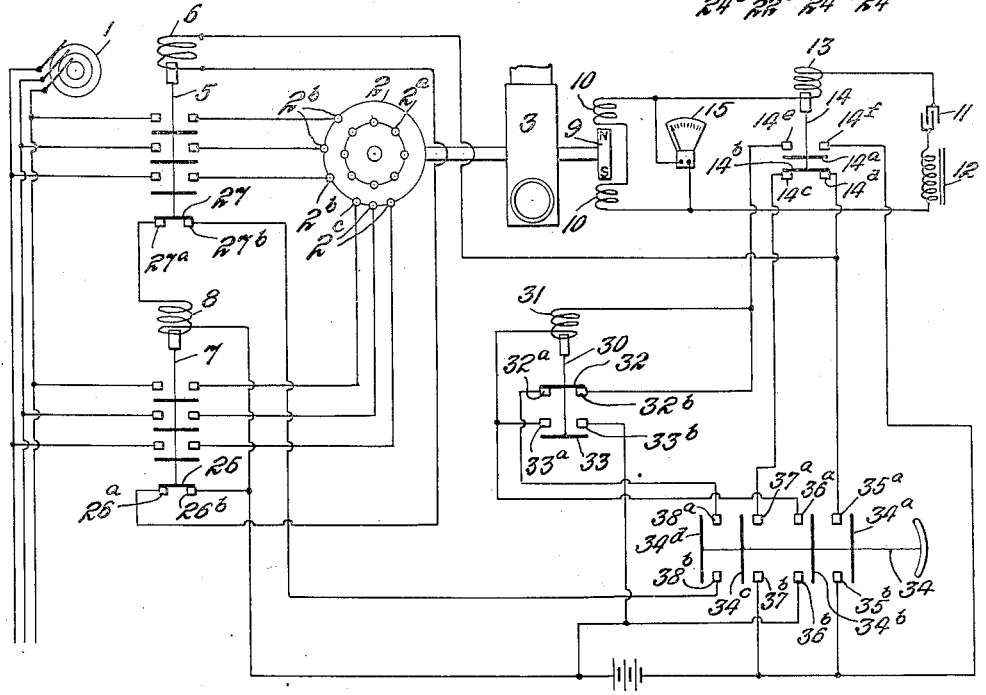

Fig. 1 is a diagram showing one application of the invention; and Fig. 2 is a diagram showing a modified embodiment.

The invention is based upon provision of a controlling means which responds to a predetermined frequency or frequencies as the frequency is changed which response is utilized for actuating the equipment to be controlled. By providing an alternating current generator related to the controlled equipment in such a way that it generates a frequency proportional to the speed of the equipment to be controlled, this frequency may be utilized to operate a relay responsive to a resonant circuit, or the frequency may be utilized in a frequency matching relay and thereby control the equipment in a predetermined manner.

Referring to Fig. 1 a three-phase generator 1 is indicated as the source of power for driving a motor 2 on the shaft of which is mounted a fan 3, or other form of device adapted to be driven at different speeds. The motor 2 is indicated as an induction motor having a squirrel cage rotor 2a. The motor is indicated as a two speed motor having a stator high speed winding having terminals 2b and having a stator low speed winding having terminals 2c. Although a two speed motor is indicated, the motor could if desired be provided with additional windings for operation at additional speeds controlled by means of the present invention but for simplicity, a two speed motor is indicated. A switch 5, controlled by a coil 6, carries three movable contacts which engage fixed contacts for connecting the high speed winding to the source 1 when the coil 6 is energized. A switch 7 is controlled by the coil 8 and carries three movable contacts which connect the low speed winding of the motor to the source 1 when the coil 8 is energized.

On the shaft of the motor or shaft of the fan 3 is mounted a generator which for simplicity, may be a magneto generator having a permanent magnet 9 rotating within stationary windings 10 for generating a voltage and current of a frequency corresponding to the speed of the motor. Instead of being mounted on the fan or motor shaft, the magneto may be mounted on a shaft driven at a speed proportional to the speed of the motor or fan. This generator should preferably be such as to deliver an electromotive-force and current of sine wave form.

The windings 10 of the frequency generator are connected in a resonant or tuned circuit which includes in series a capacitive device or condenser 11 and an inductive device or induction coil 12 having an iron core. In series with this circuit is connected a coil 13 of a responsive relay which controls a switch 14 having movable contacts 14a and 14b. When the relay is not actuated the contact 14b engages two fixed contacts 14c and 14d; and when the relay is actuated the contact 14a is in engagement with the contacts 14e and 14f. By proper design or adjustment of the capacitive device 11 to the inductive reactor and relay 13, the circuit connected to the winding 10 of the magneto generator may be made resonant at any predetermined frequency. In a circuit of this type the magneto speed and hence the fan speed, is directly measurable by the frequency and, except as affected by its own regulation characteristics, by the magnitude of the voltage of the magneto. When the fan starts from rest the current through the tuned circuit is negligible and, if the resistance component of this circuit is relatively small, will remain so as the fan is accelerated until resonance is approached when the current rises abruptly to a high value. Beyond resonance the current abruptly drops to a value at which it holds constant upon further increase in fan speed.

It is thus possible to so select a relay with pick up and drop out values that it will be actuated at, or slightly before resonance is reached, and will drop out slightly after resonance is reached; or it can be made to remain actuated after resonance depending on the type of operation desired. The fact that the current in the relay changes greatly with a slight change in speed as resonance is approached, together with the fact that condensers and inductances can be selected to retain virtually constant characteristics over long periods of time and under considerable ranges in temperature, it follows that the ordinary type of relay in such a circuit arrangement becomes very critical to frequency and therefore to speed.

Across the terminals of the frequency generator is connected an instrument 15 such as a voltmeter. The voltage of this generator will be substantially proportional to its speed and such an instrument may be used for indicating the speed of the fan by marking the scale divisions of the instrument with speed indications instead of volt indications. This instrument may be located in the superintendent's office or at any other desired location for showing the speed at which the motor and fan is operating at any time.

Another speed or frequency responsive device is indicated in Fig. 1 having controlling means responsive to two frequencies. The particular device shown is in the form of a differential bevel gear wherein one outer gear 16 is driven through a friction disk clutch 16b by a synchronous self-starting motor having a stationary winding 17 and a movable armature 17a fixed to the shaft of the driving disk of the clutch, the gear 16 being connected to the driven disk of the clutch. The other outer bevel gear 16a is driven by a synchronous self-starting motor having a winding 18 and an armature 18a fixed to the shaft of the gear 16a. These motors may be of a self-starting type commonly used for driving synchronously operated electric clocks. The middle bevel gear 19 is rotatably mounted upon a radially extending support 19a fixed to a shaft 19b in axial alinement with the gears 16 and 16a and rotatable relatively thereto. The support 19a is extended to carry a contact 20 at its outer end adapted to engage fixed contacts 20a and 20b. The winding 17 of the motor driving the gear 16 is connected across one phase of the source 1. This motor will consequently tend to drive the gear 16 through the friction disks at a speed corresponding to the frequency of the source 1. The winding 18 of the motor driving the gear 16a is connected across the circuit of the windings 10 of the magneto generator. This motor and gear 16a will therefore tend to be driven at a speed corresponding to the frequency generated by the magneto and corresponding to the speed of the fan and its driving motor. The synchronous motors driving the bevel gears may have windings and rotors related to give any desired proportionate speed in relation to the frequencies received, or these motors may be geared to drive the bevel gears 16 and 16a at any desired speed ratio with reference to the speed of the driving motors. When these motors are not connected in circuit, it may be assumed for the purpose of explanation that the contact 20 is in engagement with the contacts 20a and 20b. If the winding 17 be connected to the source 1, it will then tend to drive the gear 16 in one direction and if this be a clockwise direction looking from the motor end of gear 16, the gear 19 will tend to rotate in a clockwise direction. If it be assumed that the gear 16a is stationary, the shaft 19 will be moved in a direction tending to keep the contact 20 in engagement with its fixed contacts, the friction clutch permitting the motor to operate in synchronism with its frequency. If the speed of the magneto is below a predetermined speed, the frequency of the current delivered to the winding 18 will be insufficient to operate the gear 16a at a higher speed in a clockwise direction looking at gear 16a from its motor end, than that at which the gear 16 is operated. Consequently the contact 20 will continue to remain in contact with its fixed contacts. When however the frequency to which the winding 18 is subjected attains a critical predetermined value such as to tend to drive the gear 16a at a higher speed than the gear 16, the shaft 19 will be rotated in a direction to cause the contact 20 to open its circuit and move to an open position where it engages a fixed stop 21. The contact 20 will continue to remain in its open position as long as the frequency of the magneto is above a critical value and tends to drive the gear 16a at a higher speed than that at which the gear 16 is driven. The motors will continue to operate at speeds corresponding to the frequencies to which they are respectively subjected, the friction disks permitting compensating slippage. When however the speed and frequency of the magneto falls below this critical value, the motor driving the gear 16 will cause the contact 20 to move from its position against the stop 21 and engage the contacts 20a and 20b.

Fig. 1 also shows a manually operated switch 22 carrying three movable contacts 22a, 22b and 22c. When this switch is moved to the left from the position shown, contact 22a engages fixed contacts 23a and 24a; and contact 22b engages fixed contacts 23b and 24b. When this switch is moved to the right from the position shown, contact 22c engages fixed contacts 23c and 24c. The contacts 23a, 23b and 23c are connected to one terminal of any suitable source of current such as a battery 25. Contact 24a is connected to contact 14e of the frequency responsive relay 14. Contact 24b is connected to the contact 14d of this relay. Contact 24c is connected to a contact 14c of this relay and also to one terminal of the operating winding 6. The other terminal of this winding is connected to a fixed contact 26a engaged by a contact 26 of the low speed switch 7. The other fixed contact 26b is connected to the other terminal of the battery or source 25, as is also one terminal of the coil 8. The other terminal of this coil is connected to a fixed contact 27a engaged by a contact 27 of the high speed switch 5, the other fixed contact 27b being connected to the fixed contact 20a of the frequency matching relay. The other fixed contact 20b of this relay is connected to the contact 14f of the relay switch 14.

When the motor 2 and the fan 3 are at rest and the manual switch 22 is in the position shown, the control switches and responsive devices will be in the positions shown in Fig. 1. If it be desired to bring the motor and fan to high speed from rest, the switch 22 will be moved to the right which causes the contact 22c to engage its fixed contacts, closing a circuit from the battery 25 through the contact 22c and coil 6 and then through contact 26 of switch 7 back to the battery 25. This causes the switch 5 to be moved to a position wherein its three movable contacts will connect the high speed winding of the motor to the source 1. The motor and the fan are then brought up to full speed regardless of how the frequency responsive relays act because the circuit of operating coil 6 will be maintained without interruption. If it be desired to stop the motor, the switch 22 will be thrown from its right-hand position to the position shown in the drawing which will open the circuit of coil 6 and permit switch 5 to be thrown to its open position stopping the motor. All parts will then return to the position shown in the drawing.

If it be desired to start the motor from rest and bring it to say half speed or the speed corresponding to the low speed winding of the motor 2, the switch 22 will be moved to the left. This causes contacts 22a and 22b to engage their fixed contacts. This will automatically first connect the high speed winding of the motor 2 to the source 1 in order to avoid excessive starting strains and overloading of the low speed winding, and then will automatically disconnect the high speed winding and connect the low speed winding to the source 1 at a speed corresponding to that of the low speed winding, after which the motor will continue to operate at the intermediate speed of the low speed winding. The moving of the switch 22 to the left causes a circuit to be closed from the battery through contact 22b and through contact 14b of the frequency responsive relay which is now deenergized, and thence through the coil 6 and through contact 26 back to the battery. This energizes coil 6 and closes the switch 5 and connects the high speed winding of the motor to the source. This movement of switch 5 also raises contact 27 from its fixed contacts.

When the motor and fan reach a predetermined speed, the current in the tuned circuit abruptly rises to a magnitude sufficient to operate relay 13 and switch 14. This raises the contact 14b from its fixed contacts and causes the contact 14a to engage its fixed contacts 14e and 14f. The speed of the fan and resulting frequency at which this occurs is preferably slightly above the speed corresponding to the speed of the motor and fan when the low speed winding is connected to the source. The actuation of the frequency responsive relay 13 breaks the circuit of the high speed coil 6 at contact 14b causing the switch 5 to assume its initial position and break the motor circuit and the contact 27 to engage its fixed contacts. This completes a circuit from the battery 25 through contact 22a and 14a from which the circuit continues through the contact 20 of the frequency matching relay which is now in closed position and thence through contact 27 of the high speed switch 5 and through coil 8 of the low speed switch 7 back to battery. This throws the switch 7 to the circuit closed position and connects the low speed winding of the motor to the source 1. In this movement of the switch 7, the contact 26 is raised from its fixed contacts which introduces another break in the circuit of coil 6. The driving motor 2 and fan 3 will continue to operate at its intermediate speed with the parts in the position just described.

When it is desired to pass from the intermediate speed to the high speed, the switch 22 is moved from its left-hand position to its right-hand position. This causes the circuit of the coil 8 to be broken by the disengagement of the contact 22a from its fixed contacts, resulting in the low speed switch 7 being deenergized and in the disconnection of the low speed winding. This action causes the contact 26 to engage its fixed contacts which closes a circuit from the battery 25 through contact 22c and through coil 6 of the high speed winding, thence through the contact 26 back to the battery. This connects the high speed winding of the motor 2 to the source and brings the motor 2 and fan 3 up to the high speed. During this increase in speed, the frequency responsive relay coil 13 continues to hold the switch 14 in its upper position even though the current in this coil drops considerably at speeds above that giving a frequency to which the circuit of coil 13 is tuned because less current is required to hold this relay closed than is required to move it to the closed or actuated position. In the meantime, as soon as the speed of the motor 2 and fan 3 attains a certain predetermined frequency which is assumed to be slightly above that at which the relay 13 responded to actuate its switch, the frequency matching relay will cause the speed of the gear 16a to exceed that of the gear 16 and, as previously explained, thereby move contact 20 from its closed position to its open position against stop 21. This introduces an additional break in the circuit of the low speed relay coil 8 for interlocking purposes. The motor 2 and fan 3 will accelerate to and operate at the high speed with the parts in the position just described.

When it is desired to pass from high speed to the intermediate or low speed operation of the fan, the handle 22 is moved from its right-hand position through its mid-position to the left for engaging the contacts 22a and 22b with their fixed contacts. This moves the contact 22c from its fixed contacts and interrupts the circuit of the high speed coil 6 which permits the switch 5 to move to its open position and cause contact 27 to engage its fixed contacts. However this engagement of the contact 27 cannot close the circuit of the low speed coil 8 because it has been opened at the contact 20, even though switch 14 is in its actuated position with the contact 14a engaging its fixed contacts. The speed of the fan and its driving motor will now fall to a speed slightly above that at which the frequency responsive relay coil 13 actuated its switch 14; and at this slightly higher speed the frequency matching relay will be moved to cause its contact 20 to engage its fixed contacts. This action will be due to the frequency of the magneto falling below that at which it drives gear 16a at a higher speed than that of gear 16 which results in the gear 16 becoming more effective and moving the contact 20 to its closed position. The circuit of the coil 8 of the low speed winding is then closed through a circuit from the battery 25, contact 22a, contact 14a, contact 20, contact 27 and through coil 8 back to the battery. This connects the low speed winding of the motor 2 to the source 1 at a speed which is safe for such a connection and the motor and fan then continue to operate at a speed corresponding to the low speed winding with the parts remaining in the position last described. Of course when the switch 22 is thrown to its mid-position the circuits are deenergized and the motor and fan come to rest.

It is apparent from the above described mode of operation that the controlling apparatus insures the proper operation of the fan and its driving motor at any selected speed and that the automatically controlled impulses insure the proper sequence of operations under all change of speeds and prevents the low speed winding from being connected in circuit except when the speed of the driven motor is such as to permit a safe connection of the low speed winding. It is evident that the responsive control at a critical frequency is directly related to the speed of the driven motor and that the controlling devices are of a character that are dependable in operation and of simple form of construction.

In Fig. 2 the parts corresponding to those of Fig. 1 are similarly numbered and function in the same way. In Fig. 2 however an interlocking relay 30 is used instead of the frequency matching device of Fig. 1. This relay has a coil 31 and two movable contacts 32 and 33. When the coil 31 is deenergized the contact 32 engages two fixed contacts 32a and 32b. When the relay is energized the contact 33 is brought into engagement with the fixed contacts 33a and 33b.

The manual switch 34 is shown carrying four movable contacts 34a, 34b, 34c and 34d. In the mid-position of this switch these contacts do not engage any fixed contacts but when the switch is moved to the left, contact 34a engages contacts 35a and 35b; and contact 34b engages contacts 36a and 36b. When switch 34 is moved to the right, contact 34c engages contacts 37a and 37b; and contact 34d engages contacts 38a and 38b. The fixed contacts of the switch 34 and of the controlling relays are connected as shown in Fig. 2 and their manner of connecting will be understood from the following description of the mode of operation.

When switch 34 is moved to the left, it causes the high speed winding of the driving motor 2 to be connected to the source 1. A circuit is closed through the coil 6 of switch 5 from the battery 25 through contact 34a, coil 6 and through contact 26 of switch 7 back to the battery. This closes switch 5 and connects the high speed winding of the driving motor to the source, at the same time moving contact 27 from its fixed contacts. As the motor and fan are brought up to full speed, the frequency responsive relay 13 will cause switch 14 to be actuated so that contact 14a will engage its fixed contacts and contact 14b will be moved from its fixed contacts. This relay will remain in its actuated position upon further increase of the fan and motor speed even though the current decreases in the resonant circuit after passing thorugh the speed at which the relay 13 responds because the relay is adjusted so that a much less current serves to hold the relay contacts in their actuated position than is required to move it from its deenergized position. The movement of the speed and frequency responsive switch 14 causes a circuit to be closed from the battery through the coil 31 of the interlocking relay by a circuit extending from the battery to contact 14f, thence through contact 14a to contact 14e and then through relay coil 31, through contact 34b of switch 34 and thence to the other side of the battery. This causes the actuation of switch 30 so that the contact 32 is disengaged from its contacts and the contact 33 is brought into engagement with its fixed contacts. This closes a maintaining circuit from the coil 31 through contact 33 to the other side of the battery so that even when switch 34 is moved from its left-hand position to the mid-position or to its right-hand position, the switch 30 will remain in its actuated position, as long as the frequency responsive relay 14 remains in its actuated position, or as long as the high speed winding of the driving motor 2 is connected to the source and the motor and fan continue to operate at high speed.

If it be desired to operate the fan at the lower speed, the switch 34 is moved to the right which disengages contacts 34a and 34b from their fixed contacts and causes contacts 34c and 34d to engage their fixed contacts. This opens the circuit of the high speed coil 6 at contact 34a which disconnects the high speed winding from the source and causes contact 27 to engage its fixed contacts 27a and 27b. The fan now begins to fall in speed. When the driving motor and fan have decelerated to a speed below the speed at which the frequency responsive relay picked up and to a speed which gives a current in the resonant circuit somewhat less than the current required to hold the frequency responsive relay in its actuated position, this relay will move to its lower position, opening the circuit at contact 14a. This opens the circuit of the relay coil 31 causing its contacts to move to the position shown in the drawing. The moving of the switch 14 to its lower position closes a circuit through contact 14b and through the high speed coil 6 by a connection from the battery through contact 34c, contact 14b, coil 6, contact 26 back to the battery. This causes the high speed winding of the driving motor 2 to be connected in circuit which starts to bring the motor up to full speed. However as soon as the speed attains a value at which the frequency of the magneto generator corresponds to the tuned frequency of the resonant circuit, the coil 13 will actuate the switch 14 to open the circuit of the high speed coil 6 at the contact 14b. The switch 5 then takes the position shown in the drawing, closing the circuit thorugh the low speed coil 8 at the contact 27, this circuit being traced from the battery 25 to contact 14f, contact 14a, contact 14e, contact 32, the coil 31 now being de-energized, and from contact 32 the circuit continues through contact 34d, contact 27 and through coil 8 back to the battery. Thus the low speed winding of motor 2 will be connected to the source and the motor will operate at the lower speed.

When it is desired to pass from the lower speed to high speed, the switch 34 is moved to the left. This breaks the circuit of the low speed coil 8 at the contact 34d and the high speed coil 6 is energized to connect the high speed winding of the driving motor to the source by a circuit from the battery 25 thorugh contact 34a, coil 6, and contact 26 back to the battery. This also causes energization of the interlocking relay coil 31 by a circuit from the battery through contact 14a, coil 31 and contact 34b back to the battery. The motor will then be brought to high speed and the parts will be in the position previously described at the high speed condition, the switches 14 and 30 being held in their actuated positions.

When it is desired to start the fan from rest to an intermediate speed, the switch 34 is moved from the position shown in the drawing to the right, causing contacts 34c and 34d to engage their fixed contacts. This closes a circuit through the high speed control coil 6 and causes the high speed winding of the driving motor to be connected to the source, the circuit through the coil 6 being from the battery through contact 34c, contact 14b, coil 6 and contact 26 back to the battery. When the motor has accelerated to a point at which the frequency responsive relay 13 actuates its relay contacts, the circuit at contact 14b is broken, opening the circuit of the coil 6 and disconnecting the high speed winding of the motor from the source. The engagement of the contact 14a with its fixed contacts closes a circuit from the battery through contact 14a, contact 32 (the coil 31 remaining deenergized) thence through contact 34d and contact 27 through the low speed coil 8 back to the battery. This connects the low speed winding of the driving motor to the source and the fan then continues to be driven at the low speed with the parts remaining in the position just described.

It is apparent that the apparatus serves to protect all parts from improper operation of control and that the intermediate speed winding of the driving motor is prevented from being connected in circuit except when the speed of the motor closely approaches the speed at which the motor is driven by the low speed winding. The interconnections between the responsive relays and the manually operated switch gives a protective interlocking to insure proper control regardless of the manner in which the manual switch is operated. The frequency responsive relay and its circuit may be designed and adjusted to hold in until the current in the tuned circuit has decreased to any selected predetermined value which may or may not be near the pick-up value according to requirements; also the frequency matching relay may be of various forms of construction and design other than the particular form indicated. Instead of connecting the relay coil 13 in series in the resonant circuit, this coil may be connected in shunt with the induction coil 12 and the same results obtained.

Although particular applications and embodiments of the invention have been described, it will be understood that various other applications may be made and that the improvement may be embodied in various modifications without departing from the scope of the invention. Although certain of the claims specify a motor having high and low speed windings, or a plurality of windings, for operation of the motor at different speeds, it will be understood that these claims are intended to cover the equivalent construction wherein two or more motors, each having a winding for operation at a speed different from that of the other motor or motors, may be mounted on the same shaft and controlled in the same way as a single motor having a plurality of windings for securing operation of the driven shaft at different speeds.

I claim:

1. The combination of a motor having a high and a low speed winding for operating the motor at different speeds, means for creating an alternating current frequency corresponding to the speed of said motor, and means responsive to a condition of said frequency during deceleration of the motor for first connecting said high speed winding in circuit when the speed of the motor has fallen to a predetermined speed and then connecting said low speed winding in circuit when the speed of the motor is near the speed at which it is driven by said low speed winding.

2. The combination of an electric motor adapted to operate at different speeds, switching means for selecting the desired speed of the motor, means for creating an alternating current frequency corresponding to the speed of the motor, and means controlled by said switching means and responsive to a condition of said frequency for first connecting the motor for high speed operation and then connecting the motor for a lower intermediate speed operation during acceleration and during deceleration when the speed of the motor approximates the intermediate speed selected by said switching means.

3. The combination of an electric motor adapted to operate at different speeds, switching means for selecting the desired speed of the motor, means for creating an alternating current frequency corresponding to the speed of the motor, a resonant circuit subjected to said frequency, and means controlled by said switching means and responsive to a condition of the current in said resonant circuit for first connecting the motor for high speed operation and then connecting the motor for a lower intermediate speed operation during acceleration when the speed of the motor aproximates the intermediate speed selected by said switching means and for connecting the motor for an intermediate speed operation during deceleration from a higher speed when the speed of the motor approximates the intermediate speed selected by said switching means.

4. The combination of an electric motor adapted to operate at different speeds, switching means for selecting the desired speed of the motor, means for creating an alternating current frequency corresponding to the speed of the motor, and means controlled by said switching means for connection of the motor for high speed operation and responsive to a condition of said frequency for disconnecting the motor from high speed operation and then connecting the motor for a lower speed operation during deceleration when the speed of the motor has dropped to a speed approximating the lower speed selected by said switching means.

5. The combination of an electric motor adapted to operate at different speeds, switching means for selecting the desired speed of the motor, means for creating an alternating current frequency corresponding to the speed of the motor, a resonant circuit subjected to said frequency, and means controlled by said switching means for connection of the motor for high speed operation and responsive to a condition of the current in said resonant circuit for disconnecting the motor from high speed operation and then connecting the motor for a lower speed operation during deceleration when the speed of the motor has dropped to a speed approximating the lower speed selected by said switching means.

6. The combination of an electric motor adapted to operate at different speeds, switching means for selecting the desired speed of the motor, a frequency matching device, means for supplying alternating current to said device of a constant frequency and also supplying alternating current to said device of a frequency corresponding to the speed of the motor, and means controlled by said switching means for connection of the motor for high speed operation and responsive to said device upon the frequencies supplied thereto attaining a predetermined relationship for disconnecting the motor from high speed operation and then connecting the motor for a lower speed operation during deceleration when the speed of the motor has dropped to a speed approximating the lower speed selected by said switching means.

7. The combination of an electric motor adapted to operate at different speeds, switching means for selecting the desired speed of the motor, means for creating an alternating current frequency corresponding to the speed of the motor, a resonant circuit subjected to said frequency, a frequency matching device subjected to said frequency and also subjected to a constant frequency, contacts controlled by said device, a relay subjected to change of current in said resonant circuit, contacts controlled by said relay, and connections between said switching means, frequeny matching device contacts and relay contacts for insuring the making of connections for operating the motor at an intermediate speed only when the contacts controlled by said frequency matching device and by said relay have a predetermined relationship to each other.

8. The combination of an electric motor adapted to operate at different speeds, switching means for selecting the desired speed of the motor, means for creating an alternating current frequency corresponding to the speed of the motor, a device responsive to a condition of said frequency, contacts controlled by said device, a relay controlled by said device and by said contacts, said relay having contacts and means connecting said switching means and said contacts for insuring a connection of the motor for operation at an intermediate speed only when the contacts controlled by said device and said relay have a predetermined relationship to each other.

9. The combination of a motor having a high and a low speed winding for operating the motor at different speeds, manual switching means for determining desired connections of said high or low speed windings in circuit, means for creating an alternating current frequency directly proportional to the speed of said motor, and means responsive to a condition of said frequency and said switching means for accomplishing a desired connection in circuit of said low speed winding during acceleration and during deceleration.

10. The combination of a motor having a high and a low speed winding for operating the motor at different speeds, means for creating an alternating current frequency corresponding to the speed of said motor, manual switching means for controlling the connections of the high speed winding and for determining the connections of the low speed winding, and means controlled by said switching means and responsive to a condition of said frequency for connecting said low speed winding in circuit during acceleration and during deceleration only when the speed of said motor correspond approximately to the speed at which said motor is driven by said low speed winding.

11. The combination of a motor having a high and a low speed winding for operating the motor at different speeds, means for creating an alternating current frequency corresponding to the speed of said motor, manual switching means for controlling the connections of the high speed winding and for determining the connections of the low speed winding; and means controlled by said switching means and responsive to a condition of said frequency during deceleration of the motor for connecting said low speed winding in circuit when the speed of the motor is near the speed at which said motor is driven by said low speed winding.

12. The combination of a motor adapted to be operated at different speeds, said motor having a plurality of windings for operating the motor at different speeds, manually controlled switching means for determining the desired connection of said motor windings for operating the motor at a determined speed, means for creating an alternating current frequency corresponding to the speed of said motor, and means responsive to a condition of said frequency for accomplishing the desired connections of said motor windings for operation of the motor at a determined low speed after movement of said switching means during acceleration of the motor and during deceleration of the motor.

13. The combination of a motor adapted to be operated at different speeds, said motor having a plurality of windings for operating the motor at different speeds, manually controlled switching means for determining a desired connection of said motor windings for operating the motor at a determined speed, means for creating an alternating current frequency corresponding to the speed of said motor, a circuit controlling device responsive to a condition of said frequency, a second circuit controlling device functionally related to said first-named device, and means controlled by said devices for accomplishing the desired connections of said motor windings for operation of the motor at a determined low speed after movement of said switching means from a condition of high speed operation to a position for the determined low speed operation.

14. The combination of an electric motor, said motor, having a plurality of windings, a device responsive to the relation between two alternating current frequencies, means for supplying alternating current of different frequencies to said device, switching means for determining a desired connection of said motor windings for operating the motor at a determined speed, and controlling means affected by said switching means and responsive to said device for accomplishing the determined connections of the motors windings for operation of the motor at a determined low speed after movement of said switching means from a condition of high speed operation to a position for the determined low speed operation.

15. The combination of an electric motor, said motor having a plurality of windings, a frequency matching control device, means for supplying alternating current to said device of a constant frequency and also supplying alternating current to said device of a frequency corresponding to the speed of said motor, switching means for determining a desired connection of said motor windings for operating the motor at a determined speed, and controlling means for said motor affected by said switching means and responsive to said device upon the frequencies supplied to said device attaining a predetermined relationship for accomplishing the desired connections of the motor windings for operation of the motor at a determined low speed after movement of said switching means from a condition of high speed operation to a position for the determined low speed operation.

16. The combination of an alternating current supply circuit, an electric motor having a plurality of windings for receiving alternating current from said supply circuit, means for creating an alternating current frequency directly proportional to the speed of the motor, means for connecting one of said windings to said supply circuit, and means responsive to a critical condition of said frequency for disconnecting said last named motor winding from the supply circuit and for connecting another of said motor windings to the supply circuit when the motor reaches a predetermined intermediate speed during acceleration and also during deceleration.

17. The combination of an electric motor adapted to operate at different speeds, switching means for selecting the desired speed of the motor, means responsive to an intermediate speed of the motor, and means interrelating said switching means and said responsive means for connecting said motor for operation at an intermediate speed when the speed of the motor approximates said intermediate speed after the switching means has been moved from a condition of high speed operation to a selected position for said intermediate speed operation.

18. The combination of an electric motor having a high speed winding for operation of the motor at high speed and a low speed winding for operating the motor at an intermediate speed, switching means for selecting the desired speed of the motor, means responsive approximately to said intermediate speed of the motor, and means interrelating said switching means and responsive means for connecting said low speed winding to the supply circuit for operation of the motor at said intermediate speed when the motor has fallen from high speed to approximately said intermediate speed after said switching means has been moved from a condition of high speed operation to a position for selecting said intermediate speed operation.

19. The combination of an induction motor having a high and low speed winding for operating the motor at different speeds, manual switching means for selecting desired connections of said high and low speed windings in circuit, means for creating an alternating current frequency directly proportional to the speed of the motor, a resonant circuit subjected to said alternating current frequency, a relay in said resonant circuit subjected to said frequency and directly responsive to a predetermined frequency of said resonant circuit to actuate its contacts, and means controlled by said switching means and said relay contacts for accomplishing the selected connection of said low speed winding in circuit when said frequency corresponds to said predetermined frequency.

SOLOMON E. SCHULTZ.